H. C. Spalding,
Turning Regular Forms.
N° 14,578. Patented Apr. 1, 1856.

UNITED STATES PATENT OFFICE.

HENRY C. SPALDING, OF NEW YORK, N. Y.

LATHE.

Specification of Letters Patent No. 14,578, dated April 1, 1856.

*To all whom it may concern:*

Be it known that I, HENRY C. SPALDING, of the city, county, and State of New York, have invented a new and Improved Machine or Lathe for Turning or Cutting Polygonal-Formed Articles for Pianoforte and Table Legs, Newels, &c.; and I do hereby declare that the following is a full, clear, and exact description of the same, reference being had to the annexed drawings, making a part of this specification, in which—

Figure 2:
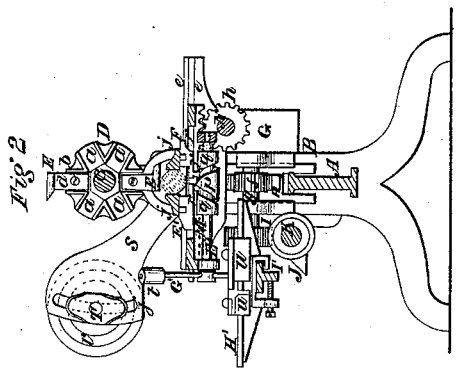
Figure 4:
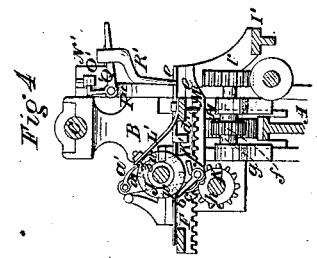
Figure 1:
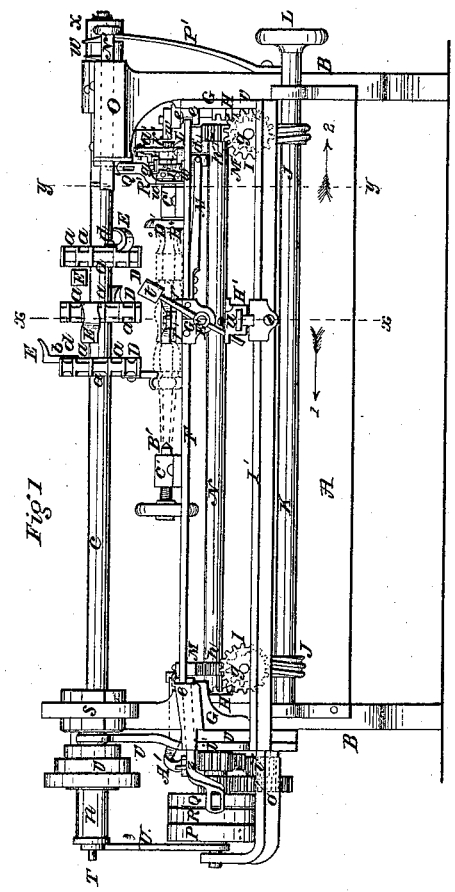
Figure 3:
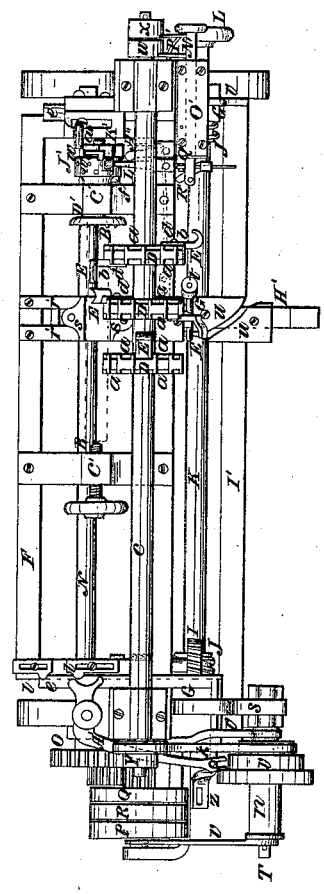

Figure 1, is a back view of my improvement. Fig. 2, is a transverse vertical section of ditto, looking in the direction of arrow 1, ($x$) ($x$) Fig. 1, showing the plane of section. Fig. 3 is a plan or top view of ditto. Fig. 4, is a transverse vertical section of ditto, looking in the direction of arrow 2, ($y$) ($y$) Fig. 1, shows the plane of section.

Similar letters of reference indicate corresponding parts in the several figures.

This invention relates to a new and improved lathe or machine for turning or cutting polygonal formed articles for pianoforte and table legs, newels, etc., whereby the sticks or stuff are turned or cut in the desired form at one operation, in consequence of the several parts working automatically as will be presently shown and described.

To enable others skilled in the art to make and use my invention. I will proceed to describe its construction and operation.

A, represents a horizontal bed piece, each end of which has an upright B, attached to it, the uprights supporting the bed piece at a suitable height.

C, represents a horizontal arbor or shaft the bearings of which are on the upper ends of the uprights B, B. On the arbor or shaft C, there are placed cutter heads D, D, D. These cutter heads are of circular form and each side of the cutter heads are provided with radial grooves ($a$) in which the shanks ($b$) of the cutters E, are secured. The grooves ($a$) at their inner ends are somewhat wider than the shanks of the cutters, so that the cutting edges of the cutters may be set more or less outward from a circle concentric with the heads, in order to give a proper feed or rake to the cutters, so that they can act properly upon the stuff. This will be understood by referring to Fig. 2, in which it will be seen that the shanks are secured in the grooves ($a$) by screws ($d$) one screw passing through each shank ($b$) and that by the gradual enlargement or width of the grooves from their outer to their inner ends, the cutting edges of the cutters may be set as specified.

The cutters E, are made of any desired form, either plain or beaded, in order to cut the several sides of the sticks or stuff of the desired form, and the cutter heads D, are placed the requisite distance apart on the arbor or shaft C, so that the cutters on one head will cut continuously with those on the adjoining heads, the cutters on the several heads extending or cutting the whole length of the stick or stuff.

F, represents a carriage the ends of which are fitted and work in grooves or between ways ($e$) ($e$) attached to slides G, G, which are attached to the uprights B, B, see Fig. 1, the slides G, being fitted between guides. Back slide G, has a vertical rack H, attached to it, see Figs. 2 and 4, into which pinions ($f$) ($f$) gear, one in each. These pinions are placed on shafts ($g$) which have each a worm wheel I, on one end, the worm wheels gearing into screws J, J, on a shaft K, which has a hand wheel L, at one end see Fig. 1. By turning the hand wheel L, the carriage F, may be raised or lowered as desired.

To each end of the carriage F, to its under side, there is attached a rack M, and into these racks pinions ($h$) ($h$) gear, said pinions being upon a shaft N, which has a toothed wheel O, at one end, shown clearly in Fig. 3. The wheel O, is connected with or gears into pinions ($i$) ($i'$) which form part of an ordinary reversing gear, which is in general use, on various kinds of machinery, and well known to machinists, and therefore does not require to be minutely described.

P, Q, are the working pulleys of the reversing gear, and R, is the idle pulley. The reversing pulley is connected with one of the slides G, and consequently moves up and down with the carriage F, see Figs. 1 and 3.

S, is an arm which projects from one of the uprights B, this arm has a curved slot ($j$) made through it, in which one end of a shaft T, is fitted, the bearings of said shaft being at the outer ends of arms U, U, the inner ends of said arms being placed loosely on the shaft of the pulleys P, Q, of the reversing gear. The shaft T, does not turn in its bearing, but has a cone of pulleys V, placed loosely upon it.

The arbor or shaft C, is the driving shaft of the machine, and a driving pulley W, and an idle pulley X, are placed on one end of the arbor or shaft, while a cone of pulleys Y, are placed upon the opposite end, a belt ($k$) passing around the pulleys V, Y, see Fig. 3.

Z, Figs. 1 and 3, is a belt shipper operated by projections ($l$) ($l$) on the carriage F, which projections strike against a lever A', which actuates the belt shipper Z, and throws a belt from the pulley P, to the pulley Q, and vice versa, said belt passing around a pulley on drum ($n$) attached to one side of the cone of pulleys V.

The slot ($j$) is struck from the center of the arbor or shaft C, or the slot may be described as forming part of a circle of which the arbor or shaft C, is the center, by this arrangement motion is given the reversing gear from the arbor or shaft C, the reversing gear being allowed to rise and fall with the carriage F, and be at varying distances from the arbor or shaft C, and operated by the same belts, because the shaft T, and cone of pulleys V, and drum ($n$) rise and fall in a curved manner, and are at all points equally distant from the arbor or shaft C, and the pulleys P, Q.

B', B'' are the center points which pass through heads C', C', on the carriage F. The stick or stuff to be turned or cut in the desired form, shown in red, is secured between the centers B', B'', the center B'', having a circular plate D', upon it provided with spurs ($o$) which penetrate the end of the stick, see Figs. 1 and 3. Underneath the carriage F, there is placed a transverse shaft E', which has a cylindrical projection or drum ($p$) upon it, said projection or drum having two spiral grooves ($q$) ($q$) cut in it, in reverse positions, see Fig. 2. In each groove ($q$) there is fitted a pin ($r$). These pins are attached to the under sides of slides F', F', a pin to each slide, and the slides are fitted and work between guides ($r'$) ($r'$) attached transversely to the carriage F. To the upper surface of each slide a jaw ($s$) is attached, the stick or stuff to be operated upon being between the two jaws, as plainly shown in Figs. 2 and 3. To the outer end of the shaft E', there is attached a lever G', the upper end of which has a weight ($t$) upon it, the lower end is fitted between the oblique or beveled inner edges of adjustable plates ($u$) ($u$) which are placed on a bar H', attached to a bar I', which is secured by pendents ($v$) ($v$) to the carriage F, see Fig. 3. On the shaft or rod of the center point B'', there is placed loosely a hub J', having holes ($w$) made in its periphery, as shown in Figs. 1, 3, and 4, and K', is an arm through the center of which the shaft or rod of the center point B'', passes, the arm being loose on said shaft. L', is a spring, having a pin ($z$) attached to its end, said pin fitting in either of the holes ($w$). To the upper end of the arm K', there is attached a pawl ($a'$) and to the lower end of the arm K', there is attached a pawl ($b'$) which bears against the under surface of the hub J', said pawl catching into the holes ($w$) in consequence of a small spring ($c'$), see Fig. 4. The lower end of the arm is also connected to a spring M', by a cord ($d'$) shown in Fig. 4, and by dotted lines in Fig. 3. To the inner side of the hub J', there is attached a pin ($e'$), see Figs. 1, 3, and 4.

N', is a belt shipper which slides or works in a horizontal box or socket O', attached to one of the uprights B. The belt shipper has a spring P', connected with it, said spring serving to keep the driving belt upon the idle pulley, when the belt shipper is not otherwise retained. The belt shipper is held or retained so as to keep the driving belt upon the working pulley by means of a hooked lever Q', which is attached to the inner side of the box or socket O', and has a pendent lever R', secured to it, see Figs. 1, 3, and 4. To the inner side of the hub J', a pin ($f'$) is attached, see Figs. 3 and 4.

Operation: The belt shipper N', is shoved in the box or socket O', till the hooked lever Q', catches into a hole therein and retains the belt shipper in proper position to keep the driving belt upon the driving pulley W. The stuff or stick is secured between the centers B', B'', and the reversing gear moves the carriage F, and the stick to be cut underneath the cutters E, which cut one side of the stick in proper form, the stick being prevented from vibrating or trembling while the cutters are acting upon it by the jaws ($s$) ($s$) which firmly grasp the center of the stick in consequence of the lower end of the lever G', being turned by the oblique ends of the plates ($u$) ($u$) the lever G', turning the drum ($p$) and the spiral grooves moving the pins ($r$) ($r$) and consequently the slides F', and jaws ($s$). When the carriage has reached the end of its forward motion, one of the projections ($l$) actuates the lever A', and the belt shipper Z, throws the belt upon the other pulley of the reversing gear, and the carriage F, returns backward, and before the carriage has completed its return motion, the upper end of the arm K'. comes in contact with a projecting arm A'', and the pawl ($a'$) is forced underneath the end of the spring L', and the pin ($z$) is raised from one of the holes ($w$) in the hub J', and the spring M', draws the lower end of the arm K', back to its original position as the carriage again moves forward, and the stick is turned the required distance between its centers by the pawl (b') so that a fresh or uncut side of the stick is presented to the action of the cutters. The stick may be turned a greater or less portion of a revolution between its centers, so that any number of sides may be formed by having different rows of holes (w) in the hub J', the spaces between the holes of the different rows varying in length, the projection A", being also made adjustable. While the stick is being turned the jaws (s) (s) are freed from the stick, the drum (p) being properly turned by the plates (u) (u) and lever G'. The carriage F, is raised or lowered to suit the thickness of the sticks, by turning the shaft K, by hand.

The advantage of the above machine is that the sticks are turned or cut at one operation and the machine may be attended by a boy or girl, as nothing is required to be done but to place the rough sticks between the centers, and to remove the finished work therefrom. The machine stops itself in consequence of the pin (f'), which when the hub J', has made an entire revolution, strikes the lower end of the pendent lever R', and throws the hooked lever Q', free from the belt shipper, which in consequence of the spring P', throws the driving belt upon the idle pulley X.

Having thus described my invention, what I claim as new and desire to secure by Letters Patent, is,

1. Attaching the cutters E, to the cutter heads D, by having the shanks (b) of said cutters fitted in taper grooves (a) which are made in the sides of the cutter heads, the inner ends of the grooves being wider than the outer ends to permit the proper adjustment of the cutters, as herein described.

2. I claim the shaft T, when arranged substantially as herein shown so that it will rise or fall curvilinearly and be at equal distances from the arbor or shaft C, at any point of its movement, so that power may be applied to the gearing which operates the adjustable and reciprocating carriage F, from the stationary arbor or shaft C, without changing the lengths of the driving belts.

3. I claim holding or securing the sticks to be operated upon by means of the jaws (s) (s) operated by the grooved drum (p) lever G', and plates (u) (u) substantially as shown and described.

4. I claim the hub J', arm K', with pawls (a') (b) attached and operated as shown for the purpose of rotating or turning the sticks the requisite distance between the centers at each movement of the carriage, so that the sticks may be cut with any desired number of sides.

5. I claim arranging the belt shipper N', substantially as shown, viz, with a hooked lever Q', and pendent lever R', and spring P', and having a projecting pin (f') attached to the side of the hub J', so that the driving belt of the machine will be thrown off the driving pulley, at each entire revolution of the hub J', so that the finished work may be removed from the machine, and fresh sticks placed between the centers.

H. C. SPALDING.

Witnesses:
O. D. MUNN,
I. MASON.